Patented May 18, 1943

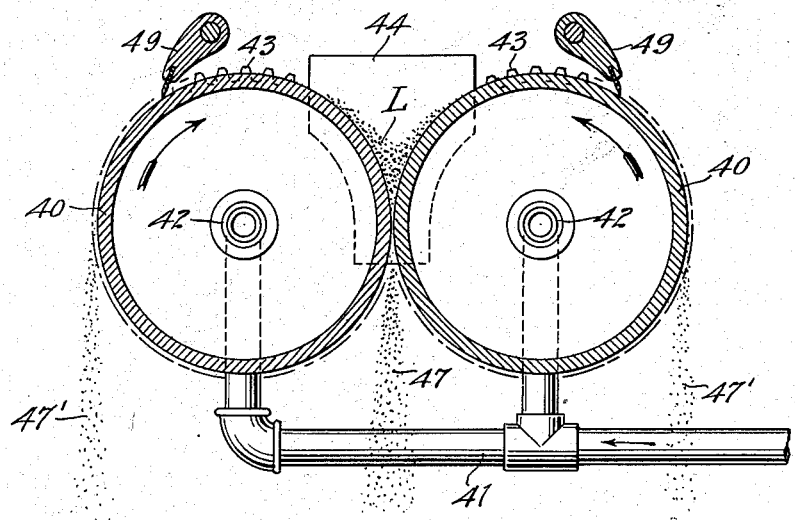
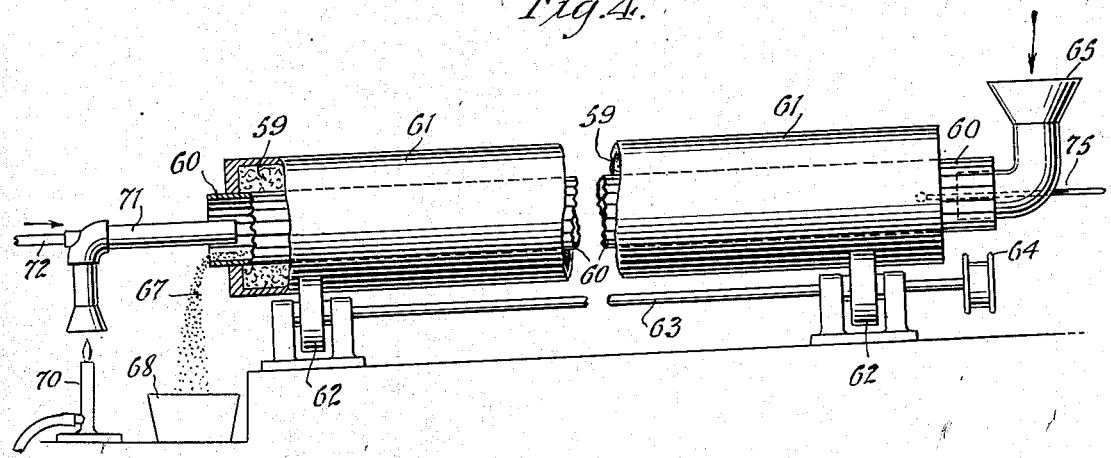

2,319,562

UNITED STATES PATENT OFFICE 2,319,562

STABLE CRYSTALLINE ANHYDROUS ALPHA LACTOSE PRODUCT AND PROCESS

Paul Francis Sharp, Ithaca, N. Y., assignor to Cornell Research Foundation, Inc., Ithaca, N. Y., a corporation of New York Application April 22, 1940, Serial No. 330,961

6 Claims. (Cl. 127—31)

Lactose is found in various forms, of which some are crystalline; and of the crystalline forms the most common are alpha lactose hydrate (the ordinary milk sugar of commerce), and beta lactose—a more valuable form, as it has greater solubility and a somewhat sweeter taste, but is more difficult to produce. Another known, but rather rare form, is dehydrated alpha lactose hydrate. This is formed when small amounts of ordinary alpha lactose hydrate are dehydrated by heating at a temperature of say 100° to 130° C. in an open dish or in a vacuum oven. The molecule of water of crystallization is expelled from the alpha lactose hydrate, leaving a dehydrated alpha lactose hydrate form which is very hygroscopic. This form of lactose re-hydrates by quickly taking up moisture from the air, even at very low humidities, to re-form ordinary alpa lactose hydrate. In the process of drying or dehydration, the crystal residue retains the same general arrangement of molecules that it had previously, except that the water molecules are missing. When this dehydrated alpha lactose hydrate is exposed to an atmosphere, even of low humidity, water molecules are taken up and immediately regain their former positions, re-creating a product similar to the original alpha lactose hydrate. The alpha lactose hydrate, either in its ordinary or dehydrated form, has relatively low initial solubility.

As distinguished from the various crystalline forms above described, I have discovered a new crystalline form of alpha anhydrous lactose, which I term stable alpha lactose anhydride, due to the fact that it remains stable at ordinary room temperatures in the presence of air of a relative humidity as high as 50%. In this new product the molecules of water are absent, as in the dehydrated alpha lactose hydrate above described, but the crystal structure is different, so that there is not the same tendency to take up the water molecules again, and the form remains stable. In the stable form the molecules of lactose have re-arranged themselves to form a new crystalline structure; the lactose molecules still retain the alpha form, as determined by optical rotation in solution, but the crystal does not have the places for the water molecules. This new product is very soluble in water at room temperature, much more soluble than either prior form of alpha lactose, and even slightly more soluble than beta lactose. For example, when water under pressure was forced through a column of crystalline stable alpha anhydride contained in a glass tube at 25° C., the emerging solution contained about 60 grams of anhydrous lactose per 100 grams of water. Because of its high solubility it is sweeter to the taste than any of the other crystalline forms of lactose previously known. This new product, stable alpha anhydride, in spite of its high solubility, may not have quite the same uses as beta lactose, because of its relatively ready crystallization into alpha lactose hydrate after having been dissolved; on the other hand, it may have desirable properties for various specified uses which beta lactose does not possess, particularly in certain cases where its initial high solubility and ready recrystallibility with a molecule of water is of importance.

This new composition of matter—stable alpha lactose anhydride—is distinguishable from other forms of lactose by various new properties, and can be produced by various processes, all of which have the general characteristic of providing temperature and moisture conditions favorable for the conversion to the stable alpha anhydride and favorable for its immediate crystallization.

Some of these various processes and properties to be described later are illustrated in the accompanying drawings, in which Fig. 1 is a diagram showing the rather broad range of temperatures at which the new product melts, with various periods of time.

Fig. 3 is a view partly in cross-section illustrating a type of roll drier or heater which may also be used to produce the new product.

Fig. 4 is a view in elevation of a rotary kiln which also may be used to produce the product.

Taking up in further detail the distinguishing features which differentiate this stable crystalline alpha lactose anhydride from other forms of lactose, this stable alpha lactose anhydride, when studied by the X-ray diffraction method, using finely pulverized crystals, shows a number of diffraction lines which differ from the lines obtained with alpha lactose hydrate, simple dedrated alpha lactose hydrate, or with beta lactose. Furthermore, these three mentioned products show X-ray diffraction lines which are not shown by the stable crystalline form of alpha lactose anhydride. This stable crystalline form of the alpha lactose anhydride will dissolve at room temperature in a solution saturated with alpha lactose hydrate in which both the alpha and beta forms in solution are in equilibrium.

Figure 1:
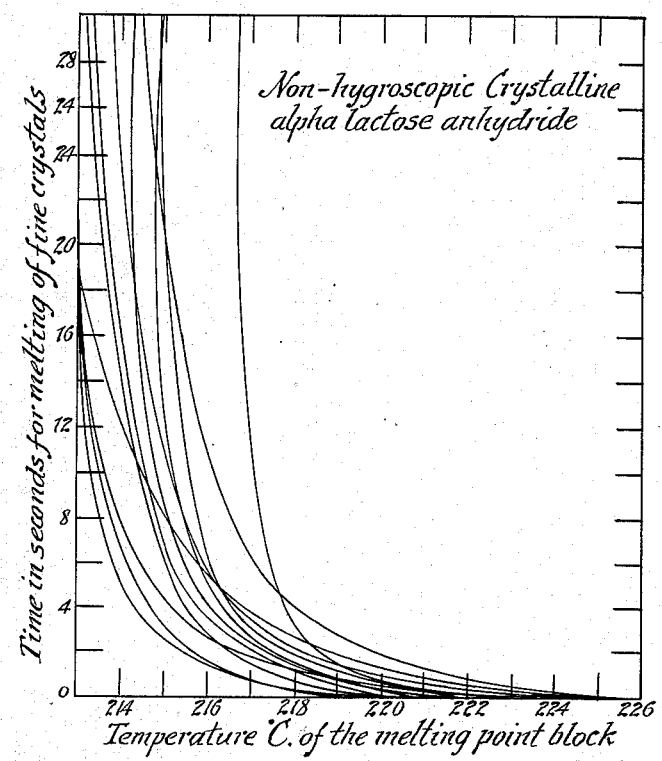

This new product has a so-called melting point higher than the so-called melting point of either the alpha hydrate or the unstable hygroscopic alpha anhydride and lower than the beta lactose. Figure 1 gives the melting point (time-temperature) curves obtained when finely ground essentially pure preparations obtained by the processes to be described later were dusted on the upper end of a cylindrical aluminum melting point block 2 inches high and 3 inches in diameter and heated from the bottom electrically. The melting was not sharp and the curves and duplicates showed considerable variation among themselves. The melting point (time-temperature) curves obtained with a number of unstable hygroscopic alpha anhydride preparations as well as a number of preparations of beta lactose showed similar variation. Melting or partial melting of both alpha hydrate and unstable dehydrated alpha hydrate occurred at about 172 to 182° C. However, a solid residue might persist as high as 190° C. or even for 15 seconds at 205° C. Finely divided beta lactose would melt almost instantly at about 240–245° C., but when held on the block for 20–30 seconds would melt at about 222–228° C. The degree of grinding of the sample was of primary importance in affecting the so-called melting point; the finer the grinding the lower the melting point. The dryness of the sample was also of importance; melting points were higher when hot crystals taken from a drying oven were dusted on the block, as compared with aliquots from a cold stoppered bottle. These products are made by high temperature treatment and probably a trace of decomposed or caramelized sugar is present originally or is produced as a result of some decomposition during the heating on the block incident to the actual determination of the melting point itself. Decomposition during heating or the presence of decomposition products would make the melting uncertain.

As before stated, this new form of lactose can be held indefinitely at room temperature at a relative humidity of 50 per cent without taking up water of crystallization or without conversion to the ordinary alpha lactose of commerce.

Another distinguishing property is that whereas the dehydrated alpha lactose hydrate dissolves in water exothermically, that is, with an evolution of heat, the new stable alpha anhydride dissolves in water endothermically, that is, with an absorption of heat.

The new product can be made by a variety of modifications of the same fundamental processes, which involve heating alpha lactose hydrate to a temperature sufficiently high to set free its water of crystallization and at the same time maintaining the crystals in a water or water vapor environment sufficiently high to be favorable to the formation and the crystallization of the stable alpha anhydride, but not so high as to favor the formation of beta lactose. If the moisture is set free from the alpha hydrate by heating a small sample in an open dish at 100–130° C., or is removed rapidly from the environment of larger masses of the crystals, by heating alpha hydrate in a high vacuum, unstable dehydrated alpha hydrate is formed. If the moisture is removed more slowly, as for example from larger masses with a partial vacuum such as $\frac{1}{10}$ to $\frac{2}{3}$ of an atmosphere, the product under ordinary conditions will consist principally of stable crystalline alpha anhydride. If the alpha hydrate is heated in a confined space such that the moisture cannot escape from the environment of the crystals, beta lactose will be produced. Thus water, but not too much, is necessary for the formation of the stable alpha anhydride. By means of equipment of the general type illustrated in Figure 2, any one of the following three products have been produced at will from alpha lactose hydrate by heating and altering the moisture environment of the crystals during the expulsion of the water of crystallization: (1) unstable hygroscopic dehydrated alpha hydrate (high vacuum); (2) crystalline stable alpha lactose anhydride (intermediate pressures); (3) beta lactose (closed pressure container).

*Example I*

Figure 2:
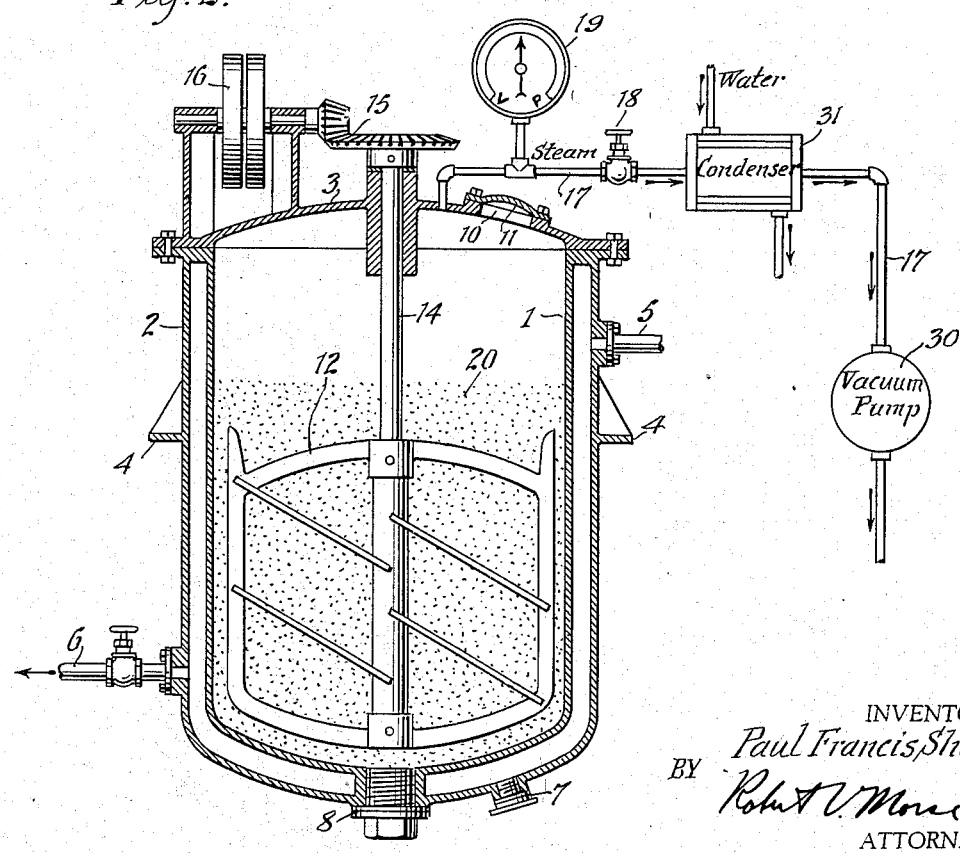
Fig. 2 is a view partly in cross-section showing a typical autoclave which may be used.

This new product may be made by various types of autoclaves and means of evacuation. One typical arrangement is shown in Fig. 2. Referring now to Fig. 2, the autoclave consists of a container 1 surrounded by a jacket 2 and closed by a cover 3, the whole being mounted or suspended on lugs 4. A pipe 5 is provided to introduce steam or other heating medium into the jacket 2, so as to heat the container 1, and a second valved pipe 6 permits the steam or other heating fluid to pass on through. A drain plug 7 is provided for the jacket 2, and a drain plug 8 is provided for the container 1. The cover 3 also has an aperture 10, which can be closed by the supplementary cover 11. The cover 11 may be used as a vent, but it is preferable to use a valve such as 18, which can be more easily controlled. A stirrer 12 is mounted on the shaft 14 and driven through the gearing 15 by any suitable means such as the belt pulleys 16. The interior of the container 1 is tapped by a pipe line 17 having regulating valve 18 by which the flow of air or steam can be controlled. A gauge 19, preferably of the combined pressure-vacuum type, is also provided, and the temperature can be read by an ordinary thermometer. The reference numeral 20 indicates the lactose crystals to be described.

The pipe 17 leads to a vacuum pump 30, and there is preferably, though not necessarily, a condenser 31 inserted in the pipe line 17 between the autoclave and the vacuum pump 30.

Using this apparatus, a process by which the stable alpha lactose anhydride can be produced is as follows: The container 1 of the autoclave is filled with a charge of dry alpha lactose hydrate (the ordinary milk sugar of commerce), and the autoclave is then closed. Steam or heat is applied to the outer jacket 2, the agitator 12 is started, and the contents of the autoclave driven up to some temperature in the neighborhood of 110–135° C. and maintained for a period of one half to two hours, depending on the rate of heating and agitation. During this process a partial vacuum is maintained in the chamber 1, by running the vacuum pump 30 with the valve 18 open. The degree of vacuum will vary somewhat with conditions, particularly with the mass of lactose involved, the degree of agitation and rate of heating of the lactose mass and the temperature. A pressure in the neighborhood of one-third to two-thirds of an atmosphere is usually satisfactory with batches of a few pounds. In this way the alpha lactose hydrate is converted to the stable form of alpha lactose anhydride. If too high a vacuum is maintained in the autoclave a mixture is obtained consisting of stable alpha anhydride and the dehydrated form of alpha hydrate. The higher the vacuum, the less of the former and the more of the latter is obtained. If an insufficient vacuum or a pressure is maintained in the autoclave, a mixture of different composition is obtained, consisting of the stable form of alpha lactose anhydride mixed with beta lactose. The success of this process involves maintaining a vapor tension in this intermediate region. If portions of the mass are not subjected to sufficient agitation, the water environment may be maintained too high in localized spots, leading to the formation of beta lactose in these localized regions, usually with caking. In controlling the operation of this process, the vacuum pump 30 is run continuously during the heating.

The progress of the process in the autoclave can be followed by the amount of water condensed in the condenser 31. Theoretically, when the process is complete, one should obtain five pounds of water for every hundred pounds of alpha lactose hydrate placed in the autoclave. Actually, because of inefficiency of the condenser, and possibly for other reasons, I obtained about 4½ pounds of water for every hundred pounds of alpha lactose hydrate introduced into the autoclave. The introduction of this condenser is not necessary to the operation of the process, but it offers a satisfactory, simple means of following the progress of the change taking place in autoclave. When water ceases to be removed, the process is finished.

Reviewing the process, the essential thing is the maintenance of a vapor pressure surrounding the alpha lactose hydrate, not too low and not too high, at an elevated temperature. Various degrees of results may be obtained with various upper and lower limits, if compensating conditions be introduced. The upper limits might be set as less than that amount of moisture resulting when the autoclave filled with alpha lactose hydrate is sealed and heated under such conditions that no moisture or only a small amount is permitted to escape; and the lower limit might be set at those conditions under which the lactose is heated under a complete or nearly complete vacuum. The best conditions are ordinarily as stated.

In general what probably occurs at the elevated temperature, at which the water of crystallization is expelled at a fairly rapid rate, is that if a part of the water expelled from the alpha hydrate is maintained in the environment of the crystals, the alpha hydrate either progressively dissolves in this small amount of water and crystallizes out as the stable alpha anhydride or during the liberation of the water and the relatively slow removal of the water from the environment of the crystal the recrystallization as stable alpha anhydride occurs. This form is more insoluble at the elevated temperature than is the alpha lactose hydrate itself, which in any case appears to be unstable or possibly does not exist in large amounts. However, there is a third form of lactose, beta lactose, which is still less soluble at the elevated temperature than the stable alpha anhydride. Therefore the moisture and temperature environment must be favorable for the conversion of the alpha hydrate to the stable alpha anhydride, and favorable for its crystallization before conversion to the beta form and crystallization of beta lactose can occur. If the water or moisture content of the environment of the crystal is too high then conditions are favorable for the next step, namely the solution and change of stable anhydride to the beta form and the crystallization of beta lactose. Conditions must be favorable for stopping the process at the crystalline stable alpha anhydride stage. This is why moisture must be present in restricted amounts in the environment of the crystal during the dehydration process. If the water liberated from the alpha hydrate is removed rapidly from the environment of the crystal before it has the opportunity to act as a solvent, dehydrated alpha hydrate is formed. If the water is removed slowly or is restricted to the environment of the crystal, the stable anhydride does not crystallize or if formed redissolves and crystallizes out as beta lactose.

Such factors as size of batch, rate of heat transfer through the lactose mass, agitation, size of crystals and localized difference in temperature have such a pronounced effect upon the moisture conditions at the actual surface of the crystals that pressure and temperature readings taken at some particular spot in the equipment serve only as an indirect guide as to the actual conditions at the crystal surface. For this reason when it is desired to make stable alpha lactose anhydride by means of suitable equipment it is best to determine by trial batches, run with that particular piece of equipment, the relation between the temperature and pressure as actually determined at some arbitrary point, and the conditions at the crystal surface. With the following to serve as a guide, anyone skilled in the art of lactose manufacture should have little trouble in so adjusting the process as to make stable alpha lactose anhydride of 90 per cent purity or better.

The progress and completeness of the removal of water is easily determined by placing a condenser as previously stated in series with the means of evacuating, in the methods employing an autoclave. Samples may also be analyzed for moisture. If condensate is not found the temperature is too low or time too short.

If after the moisture is removed the resulting product is hydroscopic, unstable dehydrated alpha hydrate has been formed because the moisture environment of the crystal was too low. In the autoclave method production of unstable anhydride means that the vacuum used was too high.

If the product is non-hygroscopic and when polarized indicates that the lactose present is essentially all in the alpha form the process has been successful and one set of conditions for its manufacture has been established.

If the product is nonhygroscopic but when dissolved and polarized at once indicates the presence of considerable amounts of beta lactose, the moisture in the environment was too high. In the case of the autoclave process, the vacuum employed was not high enough.

The following methods are suitable for the determination of the forms of lactose present in the crystalline product:

1. *Alpha lactose hydrate.*—After subjecting the product to a preliminary drying of 2 hours at 70° C. in an ordinary air oven, dry 5.000 grams in open aluminum dish for 18 hours in a vacuum oven (28–30 in.) at 100° C. with good heat transfer to the dish. No moisture loss indicates absence of alpha hydrate. Five per cent loss indicates the product was 100 per cent alpha hydrate. Intermediate losses indicate proportional fraction of hydrate.

2. *Dehydrated alpha hydrate.*—Place 5.000 grams in an aluminum dish (5 cm. diameter or more), allow to stand 1 to 2 days at 50 per cent relative humidity at room temperature. Weigh again. No gain in weight indicates absence of dehydrated alpha hydrate. A gain of 5.26 per cent indicates that the product was 100 per cent unstable dehydrated alpha hydrate. Intermediate gains in weight indicate proportional fractional amounts of hygroscopic dehydrated alpha hydrate.

3. *Alpha and beta form.*—Dissolve 5.00 grams of product quickly at 25° C. Make up to 100 milliliters and place in water-jacketed (25° C.) 2 decimeter polariscope tube and make 10 readings at 1 minute intervals, plot and extrapolate to zero time, i. e., the time water was added to sugar. Call this value I. Ordinarily the first reading will be obtained 3–4 minutes after adding water to the sugar. Allow the solution to stand 10 hours or more such as over night, after adding a drop of toluene. Adjust the solution to 25° C. and make 10 readings. Call the average F. The amount of alpha lactose on the anydrous basis present is given by the following equation:

$$\text{alpha } \% = \left(\frac{I}{F} - 0.633\right) 100.6$$

$$100 - \% \text{ alpha} = \% \text{ beta}$$

These methods of analysis when carried out by one skilled in the art are accurate to 1 to 5 per cent, depending on the care with which the determinations are made and the amount of syrup or caramelization, and decomposition of the lactose by over heating in the manufacture of the product.

Overheating, either by slow inefficient heating or heating for too long a time or at too high a temperature, tends to caramelize the sugar, produce a glass or syrup and make crystallization sluggish. Under such conditions the analyses are less accurate.

The production of this new form of lactose depends on the environmental conditions surrounding the crystal as well as upon the crystal size. The important environmental factors are temperature and moisture. The environmental moisture at the crystal surface is influenced by size of crystal and the size of the batch as well as by the rapidity of heating and the temperature. The interrelations of these environmental factors are such that the conditions for the successful carrying out of the process for making crystalline stable lactose anhydride vary greatly with the mechanical procedures used to attain proper conditions as well as with the size of the batch, shape of container, and agitation. In order to make clear the interrelation of these various factors including the size of batch, size of crystals and method of applying heat, several examples of the method of carrying out the process for making crystalline stable alpha lactose anhydride are given.

The following examples of methods of producing stable crystalline alpha lactose anhydride were developed by following the guiding principles as previously set forth. These principles if followed are sufficient to enable one skilled in the art, to carry out successfully the process of making crystalline stable alpha lactose anhydride, even when confronted with equipment and conditions similar to but not exactly duplicating those described in the following examples.

The examples all have two very important points in common. First, alpha lactose hydrate is heated to a temperature at which the water of crystallization is expelled at a fairly rapid rate at 115° C.-150° C., although temperatures varying considerably both sides of these limits have been used successfully. Second, a portion of the water expelled is maintained in the environment of the crystals or its rate of escape from the crystal is retarded. In addition to size of batch of lactose treated, the examples differ mainly in the methods of applying heat, confinement of the lactose, and control of the moisture content of the environment of the crystals or rate of escape of moisture from the region of the crystal.

*Example 2*

One thousand grams of commercial lactose alpha hydrate were placed in an autoclave, the outer jacket of which had been previously heated by circulating steam at 60 pounds pressure. The autoclave was equipped with a stirrer run by an electric motor, which by turning at the rate of about one revolution a second provided a mixing of the lactose. The autoclave used was smaller than but similar in other details to the autoclave described in Figure 2. A thermometer was inserted in a well, sealed through the top of the autoclave and projecting into the powdered lactose. An opening in the top was connected through a condenser to a vacuum pump with automatic equipment for maintaining a constant pressure of 20 cm. Hg on the lactose.

At the end of 30 minutes the thermometer reading was 103° C. At this time the partial vacuum was applied and the removal of water began immediately.

After a total of 50 minutes heating, 8.5 cc. of water were caught in the condenser and the thermometer read 112° C. At this point an alteration in the physical condition of the lactose was made apparent by added strain on the stirring motor. After 2 hours 45 cc. of water were caught in the condenser, the thermometer reading was 127°; the steam pressure in the jacket was still 60 pounds; and the transformation of the lactose was substantially complete.

The steam was turned off, the stirring and vacuum pumps were disconnected, and the autoclave allowed to cool partially. The cover was removed and the hot lactose placed in a closed container. The product analyzed 99+ per cent stable alpha lactose anhydride.

A wide range of pressures can be used to obtain essentially the same result. With 50 cm. Hg pressure the product obtained after 2 hours heating was 99 per cent stable anhydride. With 76 cm. Hg pressure (inner chamber vented to the atmosphere) the anhydrous product was obtained in one hour, but it contained only 87 per cent stable alpha anhydride and 13 per cent beta lactose, indicating the environment of the lactose was too high in moisture. With 6 cm. Hg internal pressure the anhydrous product was obtained after 3 hours but it contained 35 per cent of the hygroscopic anhydride, indicating that for this size autoclave the lactose was under too great a reduction in pressure.

*Example 3*

One thousand pounds of powdered, commercial alpha lactose were placed in a steam-jacketed autoclave of horizontal cylindrical type. It was equipped with a glass-covered manhole for observation of the interior. With the exception of a manhole at the center of the top and at the center of the bottom, the sides were steam-jacketed. The ends were not steam-jacketed. A hollow agitator shaft, which was steam-heated, passed through the axis of the cylinder. To the agitator shaft blades were attached which cleared the interior by about one inch. The agitator shaft and the interior of the autoclave were chrome plated. Appropriate connections were made to the autoclave by which either pressure or vacuum could be maintained and by which steam could be admitted. A steam pressure of 50 pounds (the maximum for which the jacket was certified) was maintained in the jacket and in the agitator shaft.

The autoclave was preheated to 265° F. before the sugar was added. The vacuum of 27 in. Hg was applied immediately after the sugar was added. Fifteen minutes after addition of the lactose the thermometer reading was 165° F. After one hour the temperature rose to 231° F. and water began to be drawn off. After two hours the temperature was 243° F. and nine pounds of water had come off. After six hours and one-half the temperature was 256° F. (124° C.) and 48 pounds of water had been removed indicating that the transformation was practically complete. The product contained 92 per cent of stable alpha anhydride and 7.5 per cent of beta lactose.

Example 4

Five grams of powdered commercial alpha lactose hydrate were placed in a small, flat-bottomed aluminum dish 5 cm. in diameter to provide a uniform layer of lactose about one-fourth inch deep. The dish was closed with a cover fitting securely enough to markedly retard diffusion of vapor but not fitting securely enough to retain vapor under pressure. The covered dish was placed on an electrically heated iron plate in an air oven with a capacity of about 1 cubic foot. The plate was heated previously to placing the lactose upon it, to a temperature so that a thermometer recorded 130 to 140° C. when immersed in mercury in an iron well resting on the heated plate and this temperature was maintained. The oven was closed and the lactose was heated for 30 minutes, which time was sufficient to remove 250 mg. water. The oven was opened and the lactose cooled by contact with a cold iron plate. This sample of lactose was 92 per cent stable alpha anhydride and 8 per cent beta lactose. The partial pressure of water vapor in the covered aluminum container under these conditions was sufficient to cause the transformation to crystalline stable alpha anhydride with the production of only a small amount of the beta form. The time required for the actual transformation of the lactose was considerably less than the 30 minutes of heating which included the time needed to heat the lactose to 130–140° C. in the absence of stirring or agitation.

Using an oven of different type, the time required for transformation of 5 grams of lactose was about 2 hours at an air temperature of 130–140° C. when the covered aluminum dish containing the lactose rested on an iron plate in contact along two edges with the walls of a cylindrical oven, said walls being heated by circulating oil.

If the lid is not put on the dish, very little stable alpha anhydride results—the product being almost wholly hygroscopic alpha lactose anhydride.

Example 5

Heating in an organic liquid immiscible with water. 50 grams of 160 mesh alpha lactose hydrate were placed in a flask of 250–500 ml. capacity and 120 ml. of organic liquid were added. The flask was connected by a stopper to a water trap tube of the Bidwell-Sterling type and condenser so arranged that when the flask was heated and the organic liquid made to boil the vapors condensed would fall in the trap tube, the water removed from the lactose, being either lighter or heavier than the organic liquid, would be trapped out while the organic liquid would return to the flask to be heated and volatilized again. The organic liquid was boiled vigorously by heating and the lactose was maintained in suspension by shaking. Heating was continued until all of the water was removed from the lactose as indicated by the amount collected in the trap. The lactose in the flask was filtered from the organic liquid and the last traces of organic liquid were removed by drying or washed out by means of some other suitable solvent. Several organic liquids are suitable for carrying out this process; among them are B-trichloroethane, chlorobenzene, xylene and toluene (particularly if used under pressure). While some specific property of the liquid influences the rapidity and completeness of conversion of alpha hydrate to stable alpha anhydride, yet in general the best results were obtained at boiling temperature in the range of 120–150° C., the process being in general shorter the higher the temperature. The product obtained consisted of about 95 per cent stable alpha anhydride and 5 per cent beta lactose. The time of distillation ranged from 45 to 120 minutes for temperatures of 151 to 161° C. The actual rate depended on the properties of the solvent used. The larger the crystals the slower the distillation. Lactose of about 160 mesh was used for these experiments: Lactose of about 80 mesh required about 50 per cent longer distillation time; 40 mesh about 150 per cent longer.

Example 6

The produce was also made on a small atmospheric double roll drum drier of the type used for drying milk. This is shown partly in cross-section in Fig. 3, and consisted of a pair of hollow cylindrical rolls 40—40 heated by steam from the pipe 41 which led to the interior of the rolls by way of the trunnions 42—42. The rolls 40—40 were rotated as indicated by the arrows by means of suitable gearing 43. Flat plates 44, usually of wood or Bakelite, pressing against the ends of the rollers 40—40, closed the ends of the trough formed by the meeting faces of the rolls, so that the lactose L to be worked on was held in between the rolls. In the small model used the rolls 40—40 were cylinders about six inches in diameter and about eight inches long, and were rotated at a rate of one revolution in one minute and 45 seconds. The steam pressure to heat the rolls was 90 pounds per sq. in.

Commercial alpha lactose hydrate was dusted on the rolls near the point of contact as the rolls turned inward. Some of the dehydrated product fell from the roll surface as indicated by the reference numeral 47, and the remainder 47' was scraped from the rolls 40—40 by the knives 49—49. The product obtained ranged from 80 to 86 per cent stable anhydride alpha lactose, and from 8 to 11 per cent beta lactose. It also contained small amounts of alpha hydrate and unstable dehydrated alpha hydrate. Apparently the transformation to the new product occurred in the region of contact between the rolls, where the momentary confinement prevented the too rapid escape of moisture.

Example 7

Confined in a thin layer on a heated surface. An aluminum melting point block was heated to 150° C. while a flat aluminum dish filled with sand rested on its surface. The dish was lifted and a layer of alpha hydrate about 1 mm. in thickness was spread on the block and the aluminum dish was at once placed upon it. After one minute the lactose was scraped from the block and the bottom of the dish and was found to consist of 86 per cent stable alpha anhydride. This is analogous to the roll heater described under Example 6.

Example 8

Crystalline alpha lactose hydrate in the form of an impalpable powder was spread by means of a spatula 0.1 to 0.3 mm. thick on an aluminum melting point block and was removed 1 minute later. When the block was maintained at a temperature of 150 to 170° C. a product was obtained which consisted of about 98 per cent stable alpha anhydride. When appreciably longer holding times were employed the product darkened and caramelized so that at the end of 10 minutes holding it was hygroscopic to the extent that it would absorb about 1 per cent of water at 50 per cent humidity. When the holding time was as short as 15 seconds the amount of stable anhydride might be reduced to 88 per cent with the hydrate and unstable anhydride present.

Example 9

Crystalline alpha lactose hydrate of 160 mesh was spread in a layer 0.1 to 0.3 mm. thick on an aluminum melting point block and removed 15 seconds later. When the block was maintained at temperatures between the range of 170 to 190° C. a product was obtained consisting of about 79 to 83 per cent stable alpha anhydride, 8 to 17 per cent beta lactose and probably a small amount of syrup or glass. The amount of beta lactose and glass formed depends on the size of the alpha hydrate crystals placed on the block. The finer the crystals the less the amount of beta and glass formed and the more of the staple alpha anhydride. When the temperature was less than 170° C. the amount of stable anhydride and beta lactose decreased and the amount of alpha hydrate and unstable hygroscopic alpha anhydride increased. When the temperature of the block was higher than 190° C. the amount of stable alpha anhydride decreased and the amount of beta and lactose glass increased.

Example 10

The new product was also made by a continuous rotary kiln, such as shown for example in Fig. 4, in which an inner corrugated tube 60 was mounted inside a smooth cylindrical casing or tube 61, so that the pipes 60—61, secured together, rotated as a unit on the rollers 62, which were driven by the shaft 63 from the pulley 64. Heat insulating material 59 was packed between the corrugated pipe 60 and the cylindrical casing 61, so that the latter remained relatively cool, while retaining the heat in the pipe 60.

An elbow 65, fitting loosely in the tube 60 provided a means for introducing the material to be treated. The tubes 60—61, which comprised the rotary kiln, were inclined at a small angle, so that as they were rotated the materials worked down thru the kiln and fell out at 67 into the container 68. The kiln 60—61 was heated by a Bunsen burner 70 which heated the air passing in thru the elbow pipe 71. Supplemental vapor in the form of steam was introduced by means of the pipe 72, in order to provide the proper water environment for the conversion of alpha hydrate to stable alpha anyhdride.

In one particular installation the corrugated pipe 60 was 4 inches in diameter and 10 feet long, the surrounding cylindrical casing 61 was 8 inches in diameter and 8 feet long; the speed of rotation was 12 revolutions per minute, and the alpha hydrate was admitted continuously at the elbow 65 at the rate of about one gram per second. The temperature as measured by a thermometer 75 inserted thru the elbow 65 was 145–160° C. The relation between the capacity of the kiln and the amount of lactose present was such that it was necessary to supply some supplemental water vapor in the form of steam thru the small pipe 72 inserted in the elbow 71, where it mingled with the heated air.

Summary

It will be seen from the foregoing that the new product, stable alpha lactose anhydride, can be made by various processes. It will be understood that so far as the product is concerned, the claims are not limited to a product necessarily made by any of the methods described, as the same product may be made by any other process without departing from the scope of the product claims.

As regards the processes described, it will be understood that the specific examples given are for the purposes of illustration to make clear the principles of the invention, which is not limited to the particular forms shown, but is susceptible to various modifications and adaptations in different installations as will be apparent to those skilled in the art, without departing from the scope of the invention as stated in the following claims.

This application is a continuation-in-part of application Serial No. 155,476, filed July 24, 1937.

I claim:

1. As a composition of matter, stable crystalline anhydrous alpha lactose, characterized by a crystalline structure stable at a relative humidity of fifty per cent at ordinary room temperature, an initial solubility higher than alpha lactose hydrate or simple dehydrated alpha lactose hydrate, dissolving in water with an absorption of heat, being a form of alpha lactose as determined by its optical rotation in solution but having a different crystalline structure than alpha lactose hydrate or simple dehydrated alpha lactose hydrate, as shown by X-ray diffraction.

2. The process of making stable crystalline anhydrous alpha lactose which consists in taking alpha lactose hydrate, heating it sufficiently above the boiling point of water to set free the water of crystallization, simultaneously maintaining a water vapor environment sufficient for the formation and crystallization of said stable anhydrous alpha lactose, said water environment being intermediate between the rapid removal of vapor by which unstable dehydrate alpha lactose hydrate is formed and the heavier vapor pressure conditions under which beta lactose is formed; and after the crystallization of the stable anhydrous alpha lactose, removing the same from the vapor environment and cooling, whereby crystals of alpha lactose anhydride are produced which are stable under conditions of fifty per cent humidity at ordinary room temperatures.

3. The process of making stable crystalline anhydrous alpha lactose which consists in taking alpha lactose hydrate, heating it above the boiling point of water to drive off the water of crystallization, retaining part of the water vapor so driven off to provide an environment adapted to the formation and crystallization of said stable anhydrous alpha lactose, said water vapor environment being intermediate between the rapid removal of vapor by which unstable dehydrate alpha lactose hydrate is formed and the heavier vapor pressure conditions under which beta lactose is formed; and after the crystallization of the stable anhydrous alpha lactose, removing the same from the vapor environment and cooling, whereby crystals of alpha lactose anhydride are produced which are stable under conditions of fifty per cent humidity at ordinary room temperatures.

4. The process of making stable crystalline anhydrous alpha lactose which consists in heating alpha lactose hydrate at a temperature sufficiently above the boiling point of water to set free the water of crystallization, and maintaining the atmosphere surrounding the crystals at a vapor tension sufficiently low to prevent the general formation of beta lactose crystals but not low enough to cause the general formatoin of dehydrated alpha lactose crystals, whereby stable crystalline alpha lactose anhydride is produced.

5. The process of making stable crystalline anhydrous alpha lactose which consists in taking alpha lactose hydrate, heating it at a temperature sufficiently above the boiling point of water to drive off the water of crystallization, maintaining water vapor in contact with the dehydrated alpha lactose hydrate at that temperature so as to recrystallize the material as stable anhydrous alpha lactose, while releasing part of the water vapor to prevent transformation to beta lactose, whereby crystalline anhydrous alpha lactose is formed which is stable at fifty per cent humidity at ordinary room temperature.

6. The process of making stable crystalline anhydrous alpha lactose which consists in heating crystalline alpha lactose hydrate at temperatures above 100 degrees centigrade and below 190 degrees centigrade, while maintaining the atmospheric environment of the crystals at a water vapor pressure above 6 cm. of mercury and below 80 cm. of mercury, whereby crystalline anhydrous alpha lactose is formed which is stable at fifty per cent humidity at ordinary room temperature.

PAUL FRANCIS SHARP.